United States Patent [19]

Thomas

[11] Patent Number: 5,249,601
[45] Date of Patent: Oct. 5, 1993

[54] FLUSHING SYSTEM FOR HOG HOUSES

[76] Inventor: Billy S. Thomas, 1096 Thomas McGeehee Rd., Sanford, N.C. 27330

[21] Appl. No.: 979,063

[22] Filed: Nov. 19, 1992

[51] Int. Cl.$^5$ ............................................ A01K 31/00
[52] U.S. Cl. ................................. 137/624.14; 251/31; 251/144; 119/16; 119/22
[58] Field of Search ............... 251/144, 30.01, 31; 137/624.11, 624.13, 624.14, 599; 119/22, 16

[56] References Cited

U.S. PATENT DOCUMENTS

| | | | |
|---|---|---|---|
| 2,688,423 | 9/1954 | Davis | 251/31 |
| 2,728,547 | 12/1955 | Crookston et al. | 251/31 |
| 3,226,078 | 12/1965 | Anderson | 251/31 |
| 4,913,095 | 4/1990 | Morrow et al. | 137/599 |

Primary Examiner—A. Michael Chambers
Attorney, Agent, or Firm—Rhodes, Coats & Bennett

[57] ABSTRACT

A waste removal flushing system for storing and selectively outputting water for flushing animal waste from a waste collection surface of a hog house or other animal pen. The flushing system includes a tank with a plurality of water output openings. A flushing valve is slidably mounted at each water output orifice on a valve guide rod that extends from a bottom surface through the water output opening, and into the tank. The valves are slidably positionable on the guide rods between a closed position where water in the tank is prevented from passing through the water output openings and an open position where water in the tank passes through the water output openings. Each valve is sized to extend beyond the outer periphery of the output opening and is sized to seat with a seating surface surrounding the output opening such that a water-tight seal is formed when the valve is in the closed position. The valve is positioned between the open and closed positions by a dual-acting, pneumatic cylinder. The pneumatic cylinder is coupled to the valve through a tubular sleeve extending from the valve head. A controller coupled between an air supply and the pneumatic cylinder provides for positioning of the valves at selected times. The controller includes a solenoid-operated, air valve for controlling the pneumatic cylinder.

20 Claims, 4 Drawing Sheets

FLUSHING SYSTEM FOR HOG HOUSES

FIELD OF THE INVENTION

The present invention is related to apparatuses for removing animal wastes from animal pens, and in particular, to hog house flushing systems for selectively outputting water from a tank to clean a hog house.

BACKGROUND OF THE INVENTION

In hog houses, and other animal confinement facilities, it is common for the contained animals to be supported by a grated floor. Excreted waste from the animals passes through the grated floor and falls onto a waste collection surface. To maintain a sanitary environment for the animals, the animal waste must be periodically removed from the waste collection surface. The waste collection surface is constructed with a slope for drainage, and water is introduced into the high end of the waste collection surface to flush waste collected on the surface. A large volume of water is typically needed to flush the waste from waste collection surface.

One type of hog house flushing system used to wash waste from the waste collection surface of a hog house is a tank flushing system. One representative prior art tank flushing system is shown in U.S. Pat. No. 4,913,095, issued Apr. 3, 1990 to Morrow et al. Prior art tank flushing systems include a tank having spaced water output openings located in the bottom of the tank. Valves are located at the water output openings and are positionable between open and closed positions to control the flow of water through the water output openings. By connecting the valves to an electric motor and controller, the valves can be positioned from the closed position to the open position at selective time intervals to periodically flush the waste collection surface of an animal pen.

The flushing of large quantities of water through the water output openings results in stresses being placed on the valves. To overcome the stresses placed on the valves during operation, the valves must be supported. Without adequate valve support, the valves will misalign with the water output openings or otherwise malfunction such that the valves do not properly control the flow of water from the tank.

In prior art tank flushing systems, valves included various valve support structures located in the tank and used to support the valve. The need to provide valve support resulted in relatively complicated valve designs that increased the overall cost of a tank flushing system. In addition, valve support structures located in the tank were exposed to the water in the tank and had to withstand the corrosive effects of the recycled water contained in the tank. Because of the relative complexity of the valves and the operating conditions of the valves, the valves of prior art flushing systems required high maintenance and had a limited lifetime.

Another probelm with prior art flushing systems is the complexity and expense of the electric motors and controllers used to position the valve between the open and closed positions. Due in part to the operating environment for a hog house flushing system, the electric motors of the prior art used to position the valves were expensive, susceptible to breakdown, and required high maintenance. In addition, an electrical power supply had to be supplied at the location of the tank to power the motor and the electric motors consumed large amounts of electricity. A tank flushing system for a hog house is needed that will withstand a farm environment and that is designed for inexpensive operation, low maintenance, and safety.

SUMMARY OF THE INVENTION

The present invention is an improved tank flushing system for hog houses and is adapted to quickly flush water from a tank to clean a waste collection surface of a hog house. The tank includes a plurality of bottom tank openings that are opened and closed by flushing valves. The flushing valves are selectively positioned between open and closed positions by pneumatic cylinders that are coupled to a controller.

When the flushing valves are in the closed position, the tank is filled with water and the flushing valves prevent water from escaping through the water output openings. At a selected time designated by the controller, the pneumatic cylinders move the flushing valves to the open position and water within the tank flows through the water output openings. The water flowing out of the tank flows over the adjacent waste collection surface. Waste that has collected on the waste collection surface is washed away as the water from the tank flows over the waste collection surface. The flushing cycle of the flushing system is repeated at selected intervals to maintain cleanliness of the hog house.

Each flushing valve is slideably mounted on a guide rod that extends through a water output opening. The guide rods are mounted to a surface below the tank and extend upwardly through the water output openings and into the tank. Each valve mounted to a guide rod is sized to extend beyond the outer periphery of the output opening and is sized to seat with a seating surface surrounding the output opening.

The mounting of the flushing valves on the guide rods helps align the flushing valves with their respective water output opening such that a water-tight seal is formed when the valves are in the closed position. The valves and their associated guide rods eliminate the need for valve support members that must be fixed to the interior of the tank. The elimination of internal valve supports fixed to the interior of the tank reduces the complexity of constructing, assembling, and maintaining a hog house flushing system.

A pneumatic cylinder is coupled to each flushing valve to provide an actuator for moving the flushing valves between the closed and open positions. The pneumatic actuators of the present invention are an improvement over the electric motor actuators disclosed in the prior art. The pneumatic cylinders are advantageous based on their relative cost, weight, maintenance requirements, and power consumption. In addition, the use of pneumatic cylinders for valve actuators in a flushing system is safer because electrical power does not have to be supplied at the location of the water tank. A pneumatic cylinder controller coupled between an air supply and the pneumatic cylinder provides for positioning of the valves at selected times. The controller includes solenoid-operated air valves for controlling the pneumatic cylinder.

DESCRIPTION OF THE INVENTION

Figure 1:
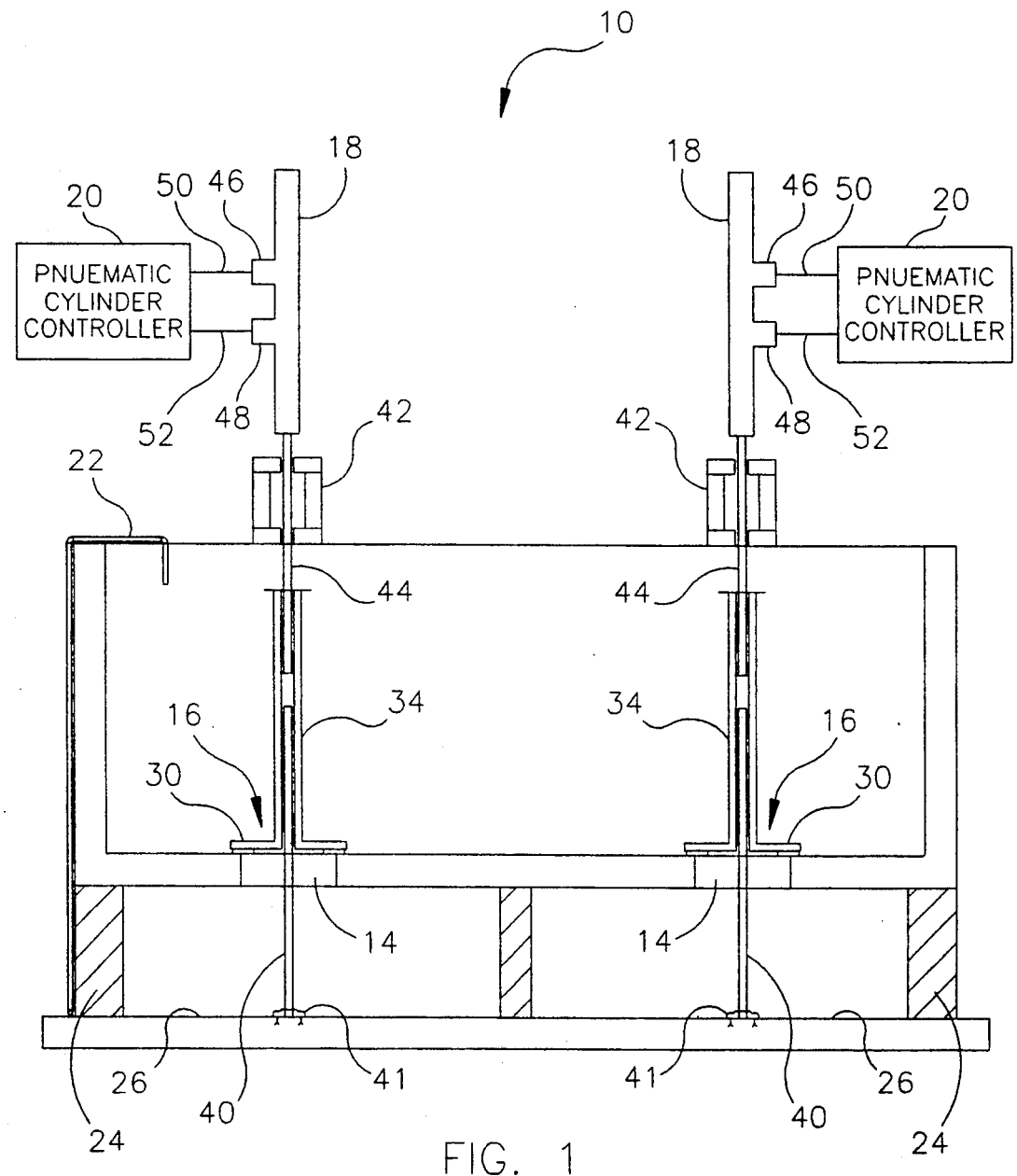
FIG. 1 is a side cross-sectional view of the flushing system of the present invention.
Figure 2:
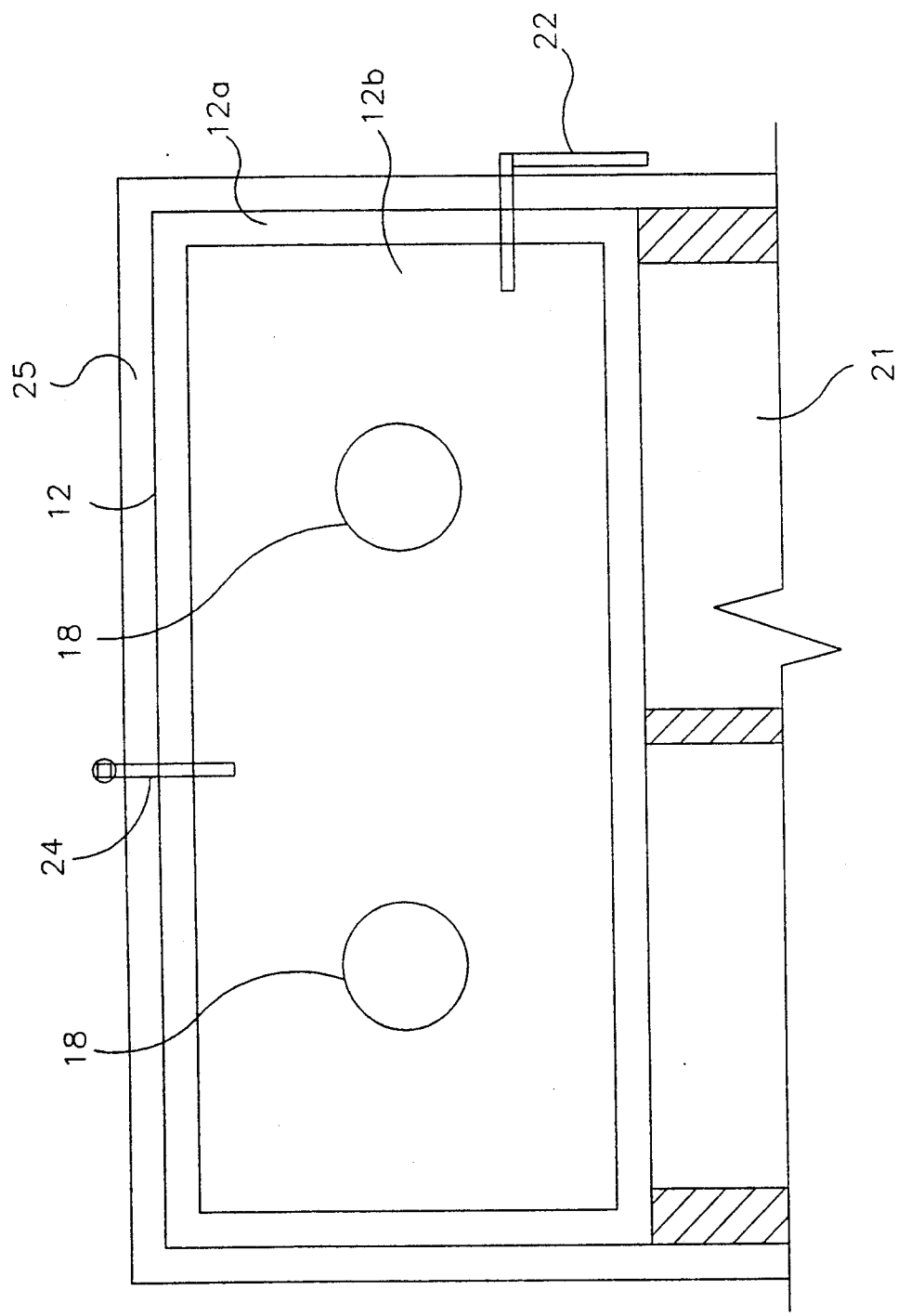
FIG. 2 is a plan view of the tank of the flushing system positioned adjacent to the waste collection surface of a hog house.

Referring to the drawings, the hog house flushing system of the present invention is indicated generally by the numeral 10. As shown in FIG. 1, the flushing system 10 broadly includes a tank 12, water output openings 14, valves 16, pneumatic cylinders 18, and controllers 20. The flushing system 10 is positioned, as shown in FIG. 2, adjacent a hog house waste collection surface 21, and is used to selectively output large quantities of water for flushing animal wastes from waste collection surface 21.

A fresh water supply line 22 and a recycle water supply line 23 are positioned in tank 12 and supply tank 12 with water. The fresh water supply line 22 is connected to a fresh water supply and provides the tank 12 with fresh water. The recycle water supply line 23 is connected to a lagoon and supplies tank 12 with recycled water from a lagoon. As is well-known in the prior art, supply line valve are used to control the level to which the tank 12 is tilted with water.

Tank 12 is preferably constructive of pre-cast concrete and is supported on concrete foundations 24 which elevate tank 12 above a floor 26. Tank 12 includes a plurality of spaced apart side walls 12a, a top 12b, and a bottom 12c. The water output openings 14 are positioned in spaced relationship along tank bottom 12c and extend through tank bottom 12c. Each water output opening 14 has a border area 14a that extends outwardly from opening 14.

Figure 3A:
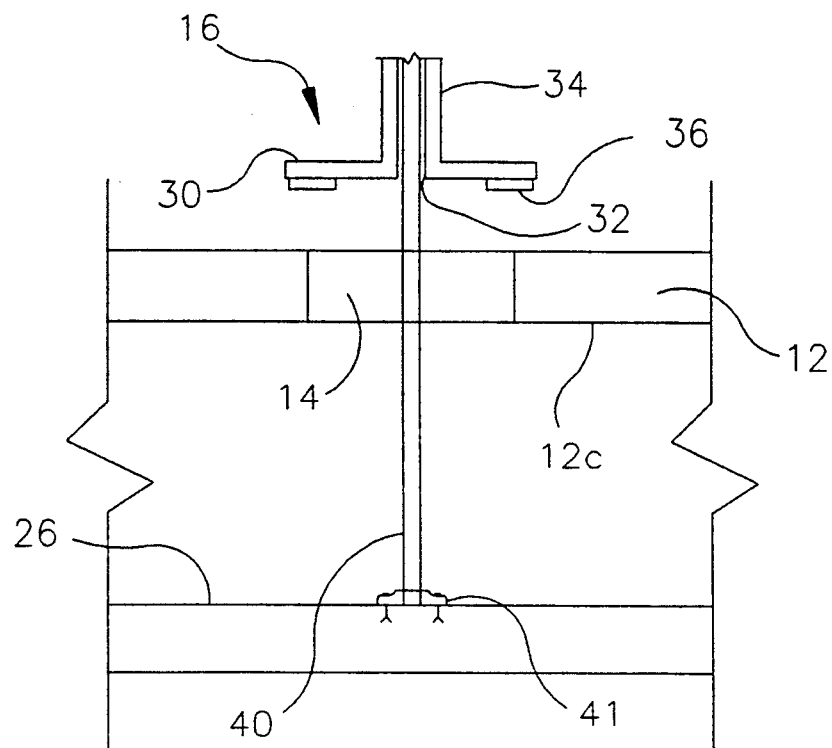
FIG. 3a is a side cross-sectional view of the valve of the present invention in an open position.
Figure 3B:
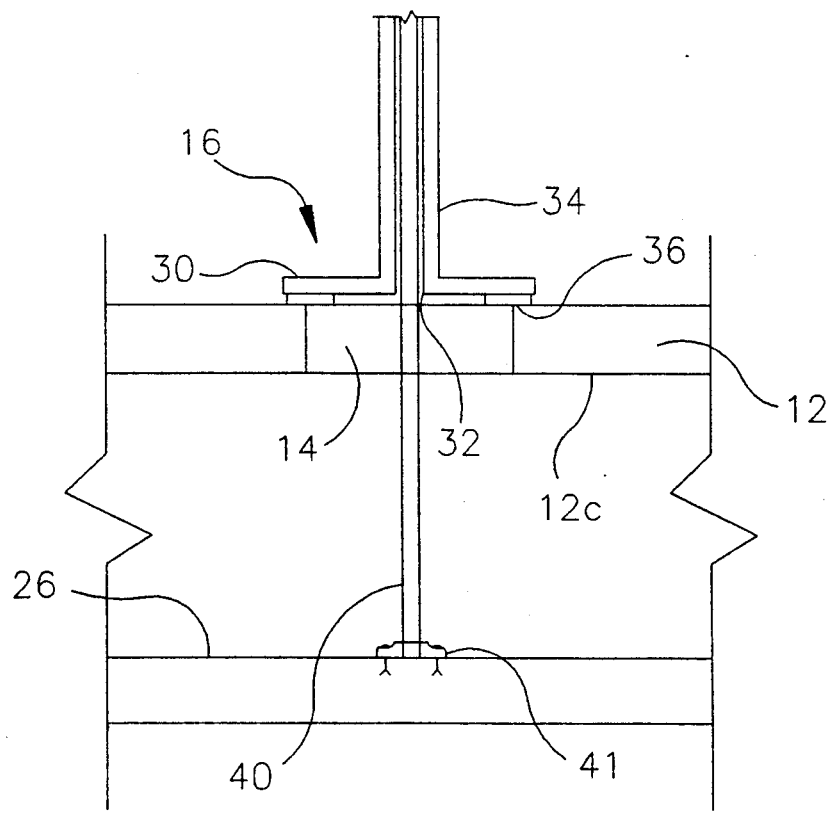
FIG. 3b is a side cross-sectional view of the valve in a closed position.
Figure 4:
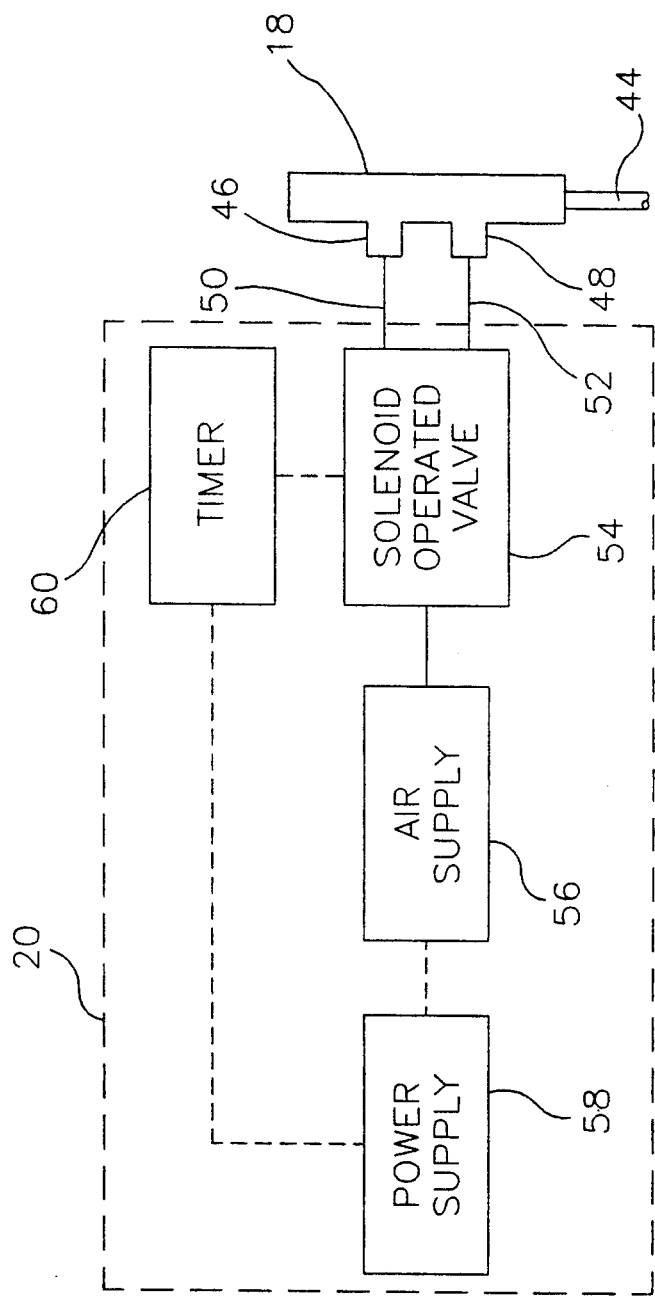
FIG. 4 is a schematic view of the controller for the pneumatic cylinder.

Valves 16 are constructed of a hard plastic and are positioned at water output opening 14 to control the flow of water through the water output openings 14. As best shown in FIGS. 3a and 3b, each valve 16 includes a valve head 30 sized to cover a water output opening 14. The valve head 30 has a circular disk shape with a center opening 32 extending through the valve head 30. Valve 30 also includes a tubular sleeve 34 with an end attached to the valve head 30 at the outer periphery of center opening 32. A rubber gasket 36 also attaches to a bottom surface 30a of each valve head 30.

A guide rod 40 acts as a support and guide for an associated valve 16. Each guide rod 40 is mounted to a floor surface located beneath the tank 12 by brackets 41 and extends upwardly through a water output opening 14 and into the interior of tank 12. Center opening 32 of valve head 30 and tubular sleeve 34 are sized in relation to guide rod 40 such that a valve 16 can be slideably mounted on a guide rod 40.

A valve 16 is positionable between an open position shown in FIG. 3a and a closed position shown in FIG. 3b. When valve 16 is in the open position, valve heads 30 are displaced from their respective water output opening 14 and block water in tank 12 from passing through openings 14.

Pneumatic cylinders 18 function as valve actuators to move the valves 16 between the open the closed positions. Each pneumatic cylinder 18 is mounted on tank top 12 by a support block 42, and is coupled to a valve 16. The piston 44 of a pneumatic cylinder 18 is attached with the tubular sleeve 34 of a valve 16 to couple a valve 16 to its associated pneumatic cylinder 18.

Pneumatic cylinders 18 are dual-acting cylinders and include an extension port 46 connected to an air line 50 and a retraction port 48 connected to an air line 52. Pressurized air is directed to either the extension port 46 or the retraction port 48 of each pneumatic cylinder 18. When pressurized air is directed into the extension ports 46, the pistons 44 are forced downwardly and valves 16 are placed in the closed position. When pressurized air is directed into the retraction ports 48, the pistons 44 are forced upwardly and valves 16 are placed in the open position.

To control pneumatic cylinders 18 and the connected valves 30, a pneumatic cylinder controller 20 is connected to air lines 50 and 52 of each pneumatic cylinder 18 to selectively control the flow of pressurized air to the pneumatic cylinders 18. Controllers 20 each include a solenoid-operated air valve 54 that directs pressurized air from an air supply 56 to either extension port 46 or retraction port 48. The solenoid-operated air valve 54 is controlled by a timer 60. Both air supply 56 and timer 60 are powered by a power supply 58.

The solenoid-operated air valves 54 are positioned to direct air into the extension ports 46 of the pneumatic cylinder 18 when the valves 16 are in the closed position. Times 60 are settable by a user to select the time interval at which the solenoid-operated air valves 54 are repositioned to direct air into the retraction ports 48 to place the valves 16 in the open position. Timers 60 for controlling solenoid-operated valves 54 are well-known in the prior art.

In operation, the hog house flushing system 10 operates as follows. A fill mode is effectuated to fill tank 12 by supplying water to tank 12 through water supply lines 22 and 23. During the fill mode, the valves 16 are positioned in a closed position to prevent water from escaping tank 12. After tank 12 has been filled with water, the waste collection surface 21 can be flushed at a time selected by an operator of the flushing system 10. The operator controls the time at which the flushing system 10 flushes by setting the timer 60 of each controller 20. At the time selected by the operator, the timer 60 of controller 20 signals its solenoid-operated air valve 54 to reposition. The air valve 54 is repositioned to channel pressurized air into the retraction port 48 instead of the extension port 46. In particular, upon repositioning of the air valve 54, air is directed from the air supply 56 through the solenoid-operated air valve 54 and to the retraction port 48 of each pneumatic cylinder 18.

Operatively connecting an air supply 56 to the retraction ports 48 of the pneumatic cylinders 18 causes the pistons 44 to be forced upwardly and the valves 32 to be placed in the open positions.

The valves 16 are displaced from water output openings 14 when in the open position and gravity causes the water within the tank 12 to be forced out of the water output openings 16. The water flowing through water output openings 16 flows along the waste collection surface 21 and flushes collected animal waste from the hog house.

At a set time period after the opening of valves 16, the timers 60 cause solenoid-operated valves 54 to reposition such that air is directed to extension port 46. The redirecting of pressurized air into extension ports 46 causes pistons 44 to be forced downwardly such that the valves 16 are placed in the closed position. The tank 12 may then be refilled for another flushing cycle at a selected time.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A waste removal flushing system for cleaning a floor of an animal pen comprising:
    (a) a tank for containing a volume of water, the tank having a top, a bottom, and side walls;
    (b) a water output opening located in the bottom of the tank;
    (c) a seating surface located on the bottom of the tank and surrounding the border edge of the water output opening;
    (d) a valve including a valve head having a diameter which is larger than the diameter of the water output opening such that an outer section of the valve head extends beyond the border edge of the water output opening, the valve positionable to a closed position where the outer section of the valve head seats against the seating surface surrounding the border edge so as to block water in the tank from passing through the water output opening, and the valve positionable to an open position where the valve is positioned away from the bottom of the tank so that water located along the bottom of the tank passes through the water output opening and flows along the floor of the animal pen;
    (e) a valve actuator for moving the valve between the closed and open positions; and
    (f) a controller for controlling the valve actuator so as to provide selective positioning of the valve between the closed and open positions at selected time intervals.

2. The waste removal system of claim 1 further including a gasket attached to the valve head, wherein the gasket surrounds the water output opening and seats against the seating surface when the valve is in the closed position.

3. The waste removal system of claim 1 wherein the valve head is substantially parallel with the seating surface, and wherein the outer section of the valve head seats substantially flat against the bottom of the tank.

4. A waste removal flushing system for cleaning a waste collection surface of an animal pen and of the type having a water-containing tank with a top, a bottom, side walls, and a plurality of water output openings located in the bottom of the tank, comprising:
    (a) a valve guide extending through each of the water output openings; and
    (b) a valve slidably mounted to each of the valve guides, wherein the valves are positionable in closed positions where the valves are positioned to block water from passing through their respective water output openings so that water remains within the tank, and wherein the valves are positionable in open positions where the valves are positioned away from their respective water output openings so as to allow water in the tank to pass through the water output openings for cleaning the waste collection surface.

5. The waste removal flushing system of claim 4 wherein each valve includes a valve head and a valve sleeve extending from the valve head, and wherein the valve guides extends through respective valve heads and valve sleeves so as to provide support to the valves for aligning each valve with its respective water output opening.

6. The waste removal flushing system of claim 5 further including a seating surface surrounding each water output opening, and wherein the valve heads are sized to extend beyond the outer borders of the output openings such that an outer section of each valve head extends beyond the outer border of the respective water output opening.

7. The waste removal flushing system of claim 6 further including a gasket attached to a bottom surface of the outer section of each valve head.

8. The waste removal flushing system of claim 4 further including a valve actuator for moving the valves between open and closed positions.

9. The waste removal flushing system of claim 8 wherein the valve actuator includes a plurality of pneumatic cylinders, wherein each valve is operatively connected to a different pneumatic cylinder.

10. A waste removal flushing system for cleaning a waste collection surface of an animal pen and of the type having a water-containing tank with a top, a bottom, side walls, and a plurality of water output openings located in the bottom of the tank, comprising:
    (a) a valve disposed at each water output opening, each valve positionable between a closed position where the valve blocks water in the tank from passing through its respective water output opening and an open position where the valve is positioned away from its respective water output opening such that the water in the tank passes through its respective water output opening;
    (b) a plurality of actuators individually connected to the respective valves for actuating the respective valves independently of one another; and
    (c) a controller system for controlling the pneumatic cylinders so as to provide selective positioning of the valves between their open and closed positions at timed intervals.

11. The waste removal flushing system of claim 10 wherein the actuators are pneumatic cylinders.

12. The waste removal flushing system of claim 10 wherein the controller system includes an individual controller operatively connected to each actuator, each controller including an air valve for selectively directing air from an air supply to its respective actuator, and wherein the respective air valves are controllable independent of one another such that the respective valves are openable and closeable at different time intervals.

13. A waste removal flushing system for cleaning a waste collection surface of an animal pen comprising:
    (a) a tank for containing a volume of water, the tank having a top, a bottom and side walls;
    (b) a water output opening located in the bottom of the tank;
    (c) a valve guide extending through the water output opening;
    (d) a valve slidably mounted to the valve guide and positionable between a closed position where the valve is positioned at the water output opening to block water from passing through the water output opening and an open position where the valve is positioned away from the water output opening to allow water in the tank to pass through the water output opening for cleaning the waste collection surface;

(e) a valve actuator for moving the valve between the open and closed positions; and (f) a controller for controlling the valve actuator so as to provide for selective positioning of the valve between the closed and open positions.

14. The waste removal flushing system of claim 13 wherein the valve includes a valve head and a valve sleeve extending from the valve head, and wherein the valve guide extends through the valve head and within the valve sleeve so as to provide support to the valve for aligning the valve with respect to the water output opening.

15. The waste removal flushing system of claim 14 further including a seating surface surrounding the water output opening, and wherein the valve head is sized to extend beyond the outer periphery of the output opening and is sized to seal with the seating surface so as to prevent water in the tank from passing through the output opening when the valve is in the closed position.

16. The waste removal flushing system of claim 15 wherein the valve forms a seal between the valve head and the seating surface when the valve is in the closed position.

17. The waste removal flushing system of claim 16 wherein the valve actuator is a pneumatic cylinder having a piston connected to the valve.

18. The waste removal flushing system of claim 17 further including a pneumatic cylinder controller for selectively controlling the actuator to controllably position the valve between the open and closed positions, the pneumatic cylinder controller including an air valve for selectively directing air to the pneumatic cylinder so as to position the valve between the open and closed positions.

19. The waste removal flushing system of claim 18 wherein the pneumatic cylinder is a dual acting cylinder having a first air port and a second air port, and wherein the valve is positioned in a closed position when air is directed into the first air port and wherein the valve is positioned in an open position when air is directed into the second air port.

20. The waste removal flushing system of claim 13 further including a guide rod mount for mounting the valve guide to a support surface outside of the tank.

* * * * *